United States Patent
Hung

(10) Patent No.: US 7,573,936 B2
(45) Date of Patent: Aug. 11, 2009

(54) ERROR DETECTION/CORRECTION SYSTEM FOR CABLE MODEM AND METHOD THEREOF

(75) Inventor: Wei-Kai Hung, Kaohsiung (TW)

(73) Assignee: Askey Computer Corp., Taipei (TW)

( * ) Notice: Subject to any disclaimer, the term of this patent is extended or adjusted under 35 U.S.C. 154(b) by 550 days.

(21) Appl. No.: 11/141,331

(22) Filed: Jun. 1, 2005

(65) Prior Publication Data

US 2006/0200851 A1    Sep. 7, 2006

(30) Foreign Application Priority Data

Mar. 2, 2005    (TW) .............................. 94106366 A

(51) Int. Cl.
*H04B 1/38* (2006.01)
(52) U.S. Cl. ..................................... 375/222
(58) Field of Classification Search ................ 375/222, 375/285, 257, 356; 370/241, 252, 253, 282, 370/230, 254; 717/171, 173
See application file for complete search history.

(56) References Cited

U.S. PATENT DOCUMENTS

| | | | |
|---|---|---|---|
| 6,510,162 B1 * | 1/2003 | Fijolek et al. | 370/432 |
| 6,697,969 B1 * | 2/2004 | Merriam | 714/46 |
| 7,007,209 B2 * | 2/2006 | Jaworski | 714/716 |
| 7,222,255 B1 * | 5/2007 | Claessens et al. | 714/4 |
| 2004/0073902 A1 * | 4/2004 | Kao et al. | 717/171 |

* cited by examiner

*Primary Examiner*—Khanh C Tran
(74) *Attorney, Agent, or Firm*—Bacon & Thomas, PLLC

(57) ABSTRACT

A error detection/correction system includes a plurality of cable modems for error detection/correction, a CMTS connected with the cable modems for access of MAC addresses of the cable modems and for controlling allocation of data flow of the cable modems, and a sample comparison system having a database of comparable data and connected with the CMTS for access of the data flow of the cable modems and then for comparison between the data flow and the comparable data to verify whether each of the cable modems functions well or not.

4 Claims, 4 Drawing Sheets

ERROR DETECTION/CORRECTION SYSTEM FOR CABLE MODEM AND METHOD THEREOF

BACKGROUND OF THE INVENTION

1. Field of the Invention

The present invention relates generally to the technology of error detection/correction for electronic instruments/equipments, and more particularly, to an error detection/correction system for multiple cable modems.

2. Description of the Related Art

Referring to FIG. 4, as known in prior art, the error detection/correction is mostly done by an error detection/correction device 51 for one network card 53, like modem card and cable modem, each time, i.e. one-on-one, through connection of RJ45 connector. In other words, the error detection/correction device 51 has to do the error detection/correction operation for the network cards 53 one by one only.

However, the operator has to replace the network cards 53 one by one during the error detection/correction, such that it causes a burden for the operator and waste of time for the error detection/correction operation. In addition, it is quite possible that the operator makes a mistake, like erroneous replacement or incorrect insertion of the cards, during the operation.

SUMMARY OF THE INVENTION

The primary objective of the present invention is to provide an improved error detection/correction system, which can do the detection/correction on multiple cable modems each time without one by one detection and replacement.

The foregoing objective of the present invention is attained by the error detection/correction system, which includes a plurality of cable modems for error detection/correction, a CMTS connected with the cable modems for access of MAC addresses of the cable modems and for controlling allocation of data flow of the cable modems, and a sample comparison system having a database of comparable data and connected with the CMTS for access of the data flow of the cable modems and then for comparison between the data flow and the comparable data to verify whether each of the cable modems functions well or not.

DETAILED DESCRIPTION OF PREFERRED EMBODIMENTS

Figure 1:
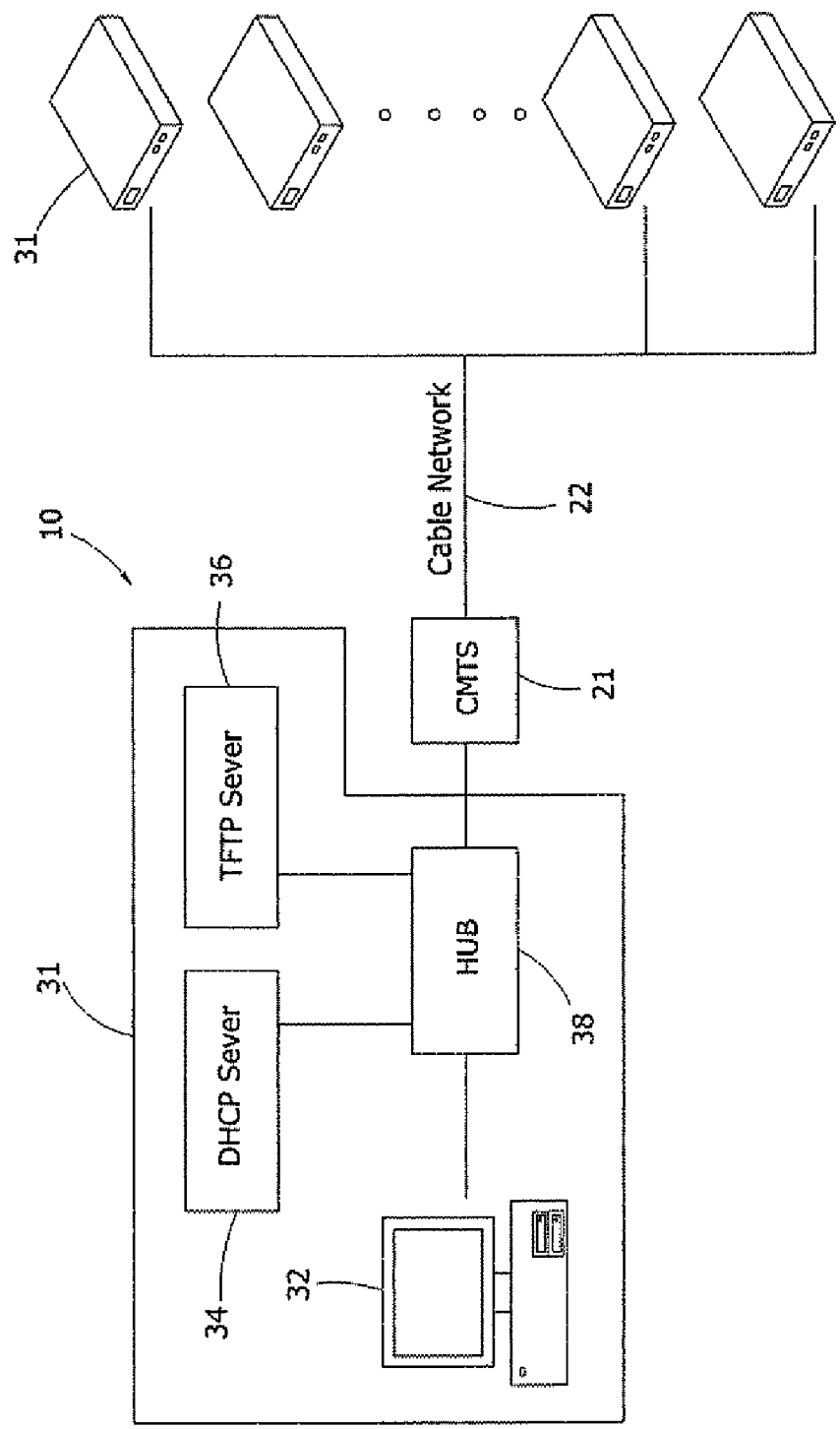
FIG. 1 is a structural schematic view of a preferred embodiment of the present invention.
Figure 2:
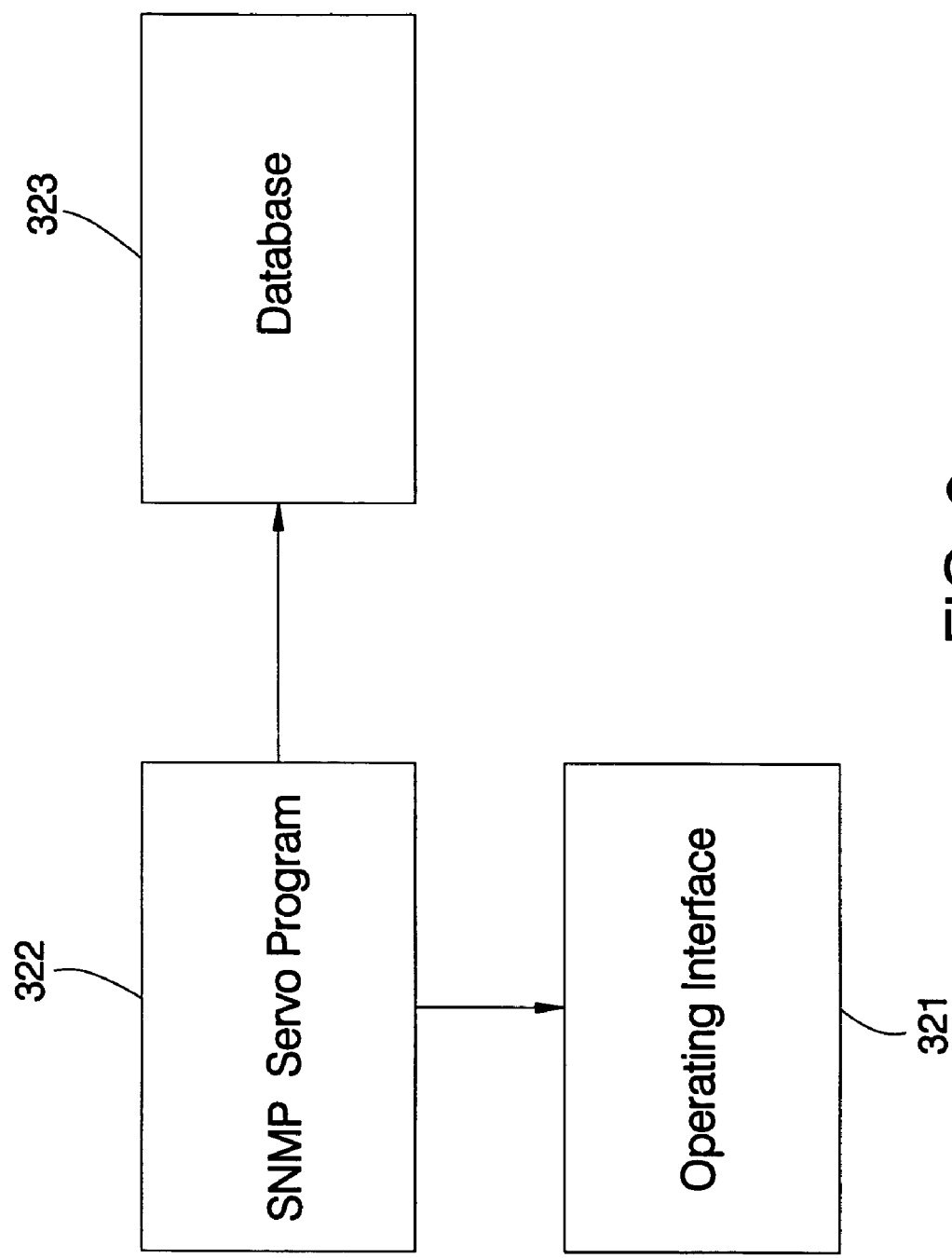
FIG. 2 is a block diagram of computer programs installed in a computer of the sample comparison system in accordance with the preferred embodiment of the present invention.

Referring to FIGS. 1-2, an error detection/correction system 10 for cable modems, constructed according to a preferred embodiment of the present invention, is composed of a plurality of cable modems 11 for error detection/correction, a CMTS 21, and a sample comparison system 31.

The CMTS 21 is connected with the cable modems 11 through coaxial cables 22, for access of MAC addresses of the cable modems 11 and controlling allocation of data flow of the cable modems 11.

The sample comparison system 31 includes a computer 32, a DHCP (dynamic host configuration protocol) server 34, a TFTP (trivial file transfer protocol) server 36, and a hub 38 connected with the CMTS 21. The computer 32, the DHCP server 34, and the TFTP server 36 are connected respectively to the hub 38 through network. As shown in FIG. 2, the computer 32 is installed with an operating interface 321 therein for operation by the operator, an SNMP (simple network management protocol) servo program 322, and a database 323 having comparable data. The sample comparison system 31 employs the SNMP servo program 322 to access data from each cable modems 11 and to do the comparison between the data of the cable modem 11 and the comparable data of the database 323 to verify whether the cable modems 11 function well or not.

Figure 3:
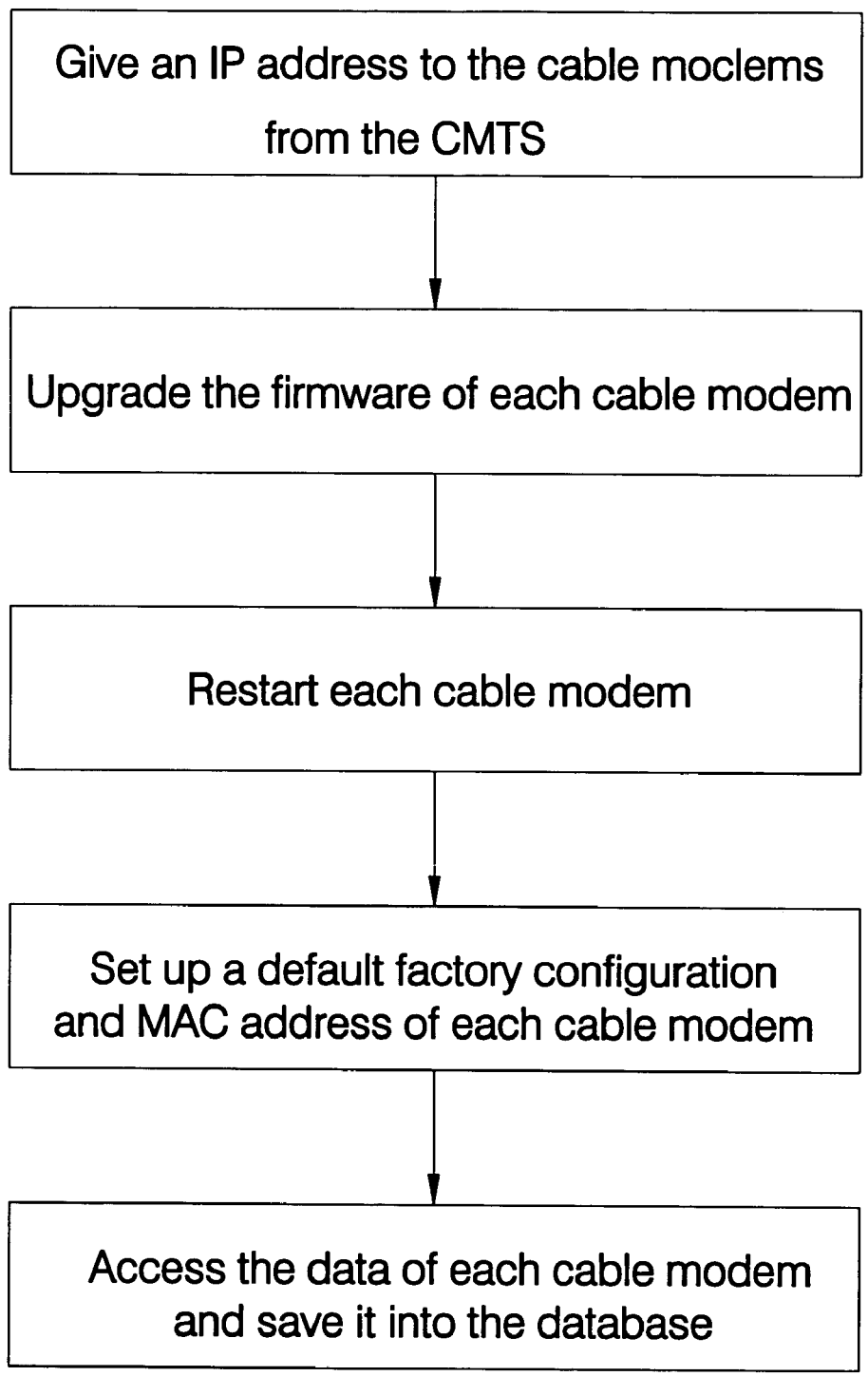
FIG. 3 is a flow chart of an operating process for the preferred embodiment of the present invention.
Figure 4:
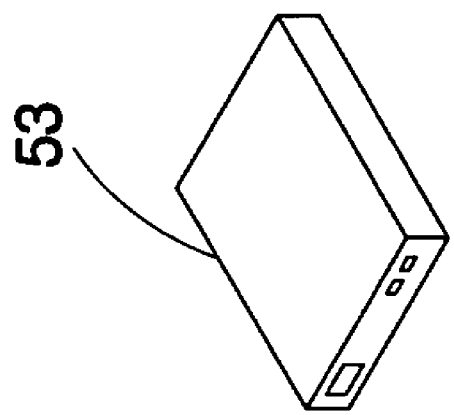
FIG. 4 is a conventional error detection/correction system.
Figure 4:
Figure 4:
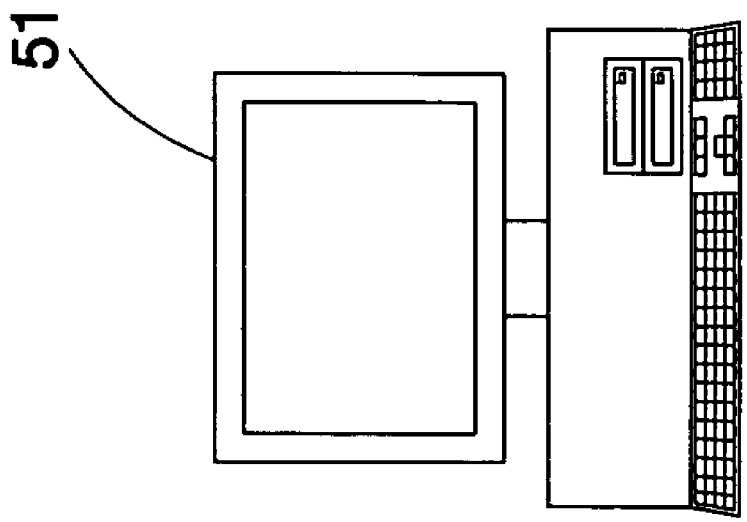

Referring to FIGS. 1-3, during the operation of the present invention, the operator logs in the operating interface 321 of the computer 32 and then commands DHCP server 34 to give an IP (internet protocol) address to each of the cable modems 11. Secondly, the operator commands the SNMP servo program 322 to control the CMTS 21 and the TFTP server 36 to upgrade the firmware of each cable modem 11. Thirdly, the operator restarts each cable modem 11 and then sets up a default factory configuration, such as MAC address, for each cable modem 11, and then commands the SNMP servo program 322 to save all of the default factory configurations of the cable modems 11 into the database 323.

As indicated above, the operator can employ the present invention to do multiple detections and setups on multiple cable modems at once without one by one replacement of the cable modems. Accordingly, it speeds up the error detection/correction operations and reduces the costs of manpower.

What is claimed is:

1. An error detection/correction system for cable modems, comprising:

a plurality of cable modems for detection;

a cable modem termination system (CMTS) connected with said cable modems for access of an MAC address of each of said cable modems and controlling allocation of data flow from said cable modems;

a sample comparison system having a database of comparable data, said sample comparison system being connected with said CMTS for access of data from said cable modems and for comparison between the data of said cable modems and the comparable data of said database to verify each of said cable modems functions well or not;

wherein said sample comparison system comprises a computer, a dynamic host configuration protocol (DHCP) server, a trivial file transfer protocol (TFTP) server, and a hub connected with said CMTS, said computer, said DHCP server, and said TFTP server being connected respectively to said hub; and wherein said computer has a database, and sets up and saves into said database a default factory configuration for each of said cable modems; said computer controls said DHCP server to give an IP address to each of said cable modems; and said computer controls said CMTS and said TFTP server to upgrade firmware of each of said cable modems.

2. The error detection/correction system as defined in claim 1, wherein said database is installed in said computer, said computer being installed with an operating interface for manual operation, and a simple network management protocol (SNMP) servo program.

3. The error detection/correction system as defined in claim 1, wherein each of said cable modems is connected through a coaxial cable.

4. An error detection/correction method for cable modems, comprising steps of:
- giving an IP address to the cable modems from a DHCP server;
- upgrading a firmware of each of said cable modems;
- restarting each of said cable modems;
- setting up a default factory configuration and a MAC address of each of said cable modems; and
- accessing data of each of said cable modems and saving said data into a database for comparison, said database being installed in a sample comparison system and having comparable data.

* * * * *